(12) United States Patent
Stoub

(10) Patent No.: US 6,389,437 B2
(45) Date of Patent: *May 14, 2002

(54) SYSTEM FOR CONVERTING SCROLLING DISPLAY TO NON-SCROLLING COLUMNAR DISPLAY

(75) Inventor: Everett W. Stoub, Hillsboro, MO (US)

(73) Assignee: ION Systems, Inc., Crystal City, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,972

(22) Filed: Jan. 7, 1998

(51) Int. Cl.[7] ............... G06F 17/21; G06F 17/25
(52) U.S. Cl. ............... 707/523; 707/513; 345/784; 345/788; 345/760
(58) Field of Search ............... 707/523, 517, 707/521; 345/302, 901, 342, 784, 788, 760

(56) References Cited

U.S. PATENT DOCUMENTS

| | | | |
|---|---|---|---|
| 4,608,664 A | * 8/1986 | Bartlett et al. | 707/517 |
| 4,686,649 A | * 8/1987 | Rush et al. | 707/517 |
| 4,709,348 A | 11/1987 | Horn et al. | 707/525 |

(List continued on next page.)

OTHER PUBLICATIONS

Anonymous, "Method to Permit Rapid Reading of Displayed Text", International Business Machines Technical Disclosure Bulletin, v. 28, n. 2, pp. 513–515 (reprinted), Jul. 1985.*

Dyson, P. E., "FutureTense's Texture: slow page viewer mars powerful design tool," Seybold Report on Internet Publishing, vol. 1 No. 1, pp. 5–8, Sep. 1996.*

Wagstaff, Sean, "FutureTense Texture 1.1 designs dynamic pages. (Future Tense's Web authoring software) (Software Review)(Evaluation)," MacWEEK, vol. 11 No. 16, pp. p38(1), Apr. 1997.*

(List continued on next page.)

Primary Examiner—Joseph H. Feild
Assistant Examiner—Jeffrey Allen Rossi
(74) Attorney, Agent, or Firm—Lathrop & Gage L.C.

(57) ABSTRACT

A computer system for automatically converting a scrollable electronic document, including text, graphics, tables and combinations, from a scrollable format to a non-scrollable format, the system comprising a page-forming mechanism configured to operatively and automatically arrange the scrollable electronic information document into a plurality of non-scrollable pages, each having one or more columns wherein each of the columns has a width corresponding to a number of characters per line within a predetermined range of characters per line, a content formatter mechanism configured to be operatively responsive to embedded formatting commands, either common word-processing commands or html commands or both; a font-sizing mechanism configured to operatively permit a user to selectively alter the size of the characters comprising the non-scrollable pages; an image sizing mechanism configured either to automatically alter the widths of graphic images and tables in the electronic document to proportionately conform to the width of the columns, or to reduce the graphic images and tables to selectively expandable icons positioned in the display; a screen having a display window configured to entirely display a selected one of the non-scrollable pages; and a page-turning mechanism configured to selectively, sequentially and individually display the plurality of non-scrollable pages in the display window. A method is provided for practicing the system.

77 Claims, 6 Drawing Sheets

U.S. PATENT DOCUMENTS

| | | | |
|---|---|---|---|
| 4,891,771 A | * 1/1990 | Edel et al. | 707/521 |
| 5,021,772 A | 6/1991 | King et al. | 345/632 |
| 5,089,990 A | * 2/1992 | Saito | 707/521 |
| 5,175,813 A | 12/1992 | Golding et al. | 345/786 |
| 5,263,134 A | 11/1993 | Paal et al. | 345/788 |
| 5,333,247 A | 7/1994 | Gest et al. | 345/672 |
| 5,524,201 A | 6/1996 | Shwarts et al. | 345/763 |
| 5,528,260 A | 6/1996 | Kent | 345/123 |
| 5,633,996 A | * 5/1997 | Hayashi et al. | 707/521 |
| 5,634,064 A | * 5/1997 | Warnock et al. | 345/788 |
| 5,737,558 A | * 4/1998 | Knight, III et al. | 345/788 |
| 5,771,032 A | 6/1998 | Cline et al. | 345/786 |
| 5,860,073 A | * 1/1999 | Ferrel et al. | 707/522 |
| 5,903,903 A | 5/1999 | Kennedy | 707/525 |
| 5,909,690 A | * 6/1999 | Tanigawa et al. | 707/526 |
| 5,926,825 A | * 7/1999 | Shirakawa | 707/521 |
| 6,012,071 A | * 1/2000 | Krishna et al. | 707/522 |
| 6,029,182 A | * 2/2000 | Nehab et al. | 707/521 |
| 6,232,967 B1 | * 5/2001 | Kelley et al. | 345/684 |
| 6,266,684 B1 | * 7/2001 | Kraus et al. | 707/513 |
| 6,281,986 B1 | * 8/2001 | Form | 345/522 |

OTHER PUBLICATIONS

Corel WordPerfect, Corel Corporation Limited, pp. 1–18; Apr. 15, 1996 (Screen Shots).

IBM Technical Disclosure Bulletin, vol. 33, No. 9, Feb. 1991, pp. 225–229.

IBM Technical Disclosure Bulletin, Vo. 37, No. 12, Dec. 1994, pp. 15–16.

* cited by examiner

SYSTEM FOR CONVERTING SCROLLING DISPLAY TO NON-SCROLLING COLUMNAR DISPLAY

BACKGROUND OF THE INVENTION

1. Field of the Invention

Computer Program Listing Appendix

A computer program listing appendix on compact disk is included in this application. Appendix A and Appendix B are contained on a compact disk herewith as Appendix A.txt (space included), 51KB, loaded on the disk Nov. 21, 2001, and Appendix B.txt (no space included), 212KB, loaded on the disk Dec. 19, 2001, both of which are in ASCII format for an IBM PC/MS Windows compatible computer system, and both of which are incorporated herein by reference.

This invention relates generally to a display control system and, more particularly without limitation, to a system for controlling the display on the screen of a computer monitor for the purpose of reducing eye strain of, and increasing readability for, a user.

2. Description of the Related Art

Reading has never been a particularly natural task for the human eye, but scanning text on a computer screen appears to be especially more effortful than it is on a printed page. While the popular view of this phenomenon is that text on computers causes eye strain, it is more likely that text viewing generally increases the cognitive load on the user in a variety of ways. One of the main factors that may contribute to difficulty reading text on a computer screen has to do with document length. A common solution used to display long documents is to scroll the screen to bring more of the material into view. Prior art employs two scrolling strategies: screen-by-screen, line-by-line. The problem is that, however efficient these scrolling strategies are from an engineering standpoint, they may actually make the reading task more difficult for the user. The relevant issues encompass three key aspects of readability, namely reading speed, reading comprehension, and reading ease, each of which can be observed and measured as viewer performance variables. Content complexity can be considered a control variable, and should be used to distinguish effects among the three performance variables bearing on readability.

Users employ two strategies to move down through a long document, either to advance screen-by-screen or line-by-line, neither one of which is conducive to natural reading. Scrolling screen-by-screen is disruptive to the reading experience because it causes users to lose their place, forcing them to free cognitive resources away from text comprehension in order to reorient the eye in the proper location in the text. The other option is to scroll line-by-line, ensuring that only previously viewed material is removed from view, not new material. However, this imposes a control task on the reader that similarly drains cognitive resources away from the primary task of text comprehension.

Such strain is due in part to the sudden and repetitive vertical shifting of screen contents and the natural attempt by the human visual system to follow such apparent motions. It may also be due in part to a reduction of blinking, since the flicker caused by scrolling spoofs physical blinking. Continuous scrolling, by more or less constant vertical motion of screen contents, likewise subjects the viewer to strain due to finer, but more frequent, vertical steps and flicker. Furthermore, continuous scrolling rarely achieves real freedom from the distraction of display control; reading speed normally varies with content complexity, which may change substantially both within and between documents.

Thus, in choosing any of the commonly available scrolling strategies for consuming substantial reading material on-screen, the readability of the material is normally compromised. This happens either by disruptions in information flow, by distractions from the task of consuming and comprehending information, or by additional eye stress and fatigue. Fatigue may even foreshorten the consumption of significant amounts of readable material and affect comprehension.

Another problem with using a computer monitor for consuming readable material is that lines of text generally span from near one side of the monitor to the other. This may require substantial lateral eye movement for every line of text, which can cause user fatigue. Upon completion of reading one line of test, the human visual system generally retraces the line to find the beginning of the subsequent line of text. If the line of text is too long relative to its height, retrace errors can occur, disrupting the flow of information similarly to the incomplete scrolling problem previously described. Thus, readability is again compromised in reading ease and reading speed domains.

Prior art attempts to resolve this particular problem generally introduces either reduced-width columns or multiple columns of material on-screen. Reduced-width columns are certainly more readable, having shorter lines that are more easily retraced. However, reduced width columns also result in more scrolling, since the area required to present the material is more or less fixed, and reducing the width merely increases the depth needed to be reached by scrolling. Multiple columns of material may also result in reduced column width. However, the typical presentation layout principle is to form columns with a sufficient depth to reach the bottom of the printable page, and is primarily suited for off-screen consumption. Alternatively, a presentation layout principle for on-screen consumption is to more or less balance the depth of the columns. In this case, the scrolling task is even greater; the viewer must scroll to the bottom of a column and then scroll completely back to the top of the subsequent column. Thus, these prior art attempts to manage column widths may actually result in additional losses to readability.

Another common problem is the use of inappropriate type fonts in presenting material on-screen. The publisher may make use of rather small fonts, which can crowd more information onto the screen at once, thereby reducing the amount of scrolling required for complete consumption of the presented information. This strategy generally results in additional eye strain, due to squinting or straining to read uncomfortably small print, and due to increased retrace errors caused by long narrow lines of text. Again, readability is compromised. The significance of type fonts as bearing on readability is dependent on individual viewers (visual acuity) and on their environment (external lighting and monitor quality). Individual response to eye strain, as caused by small fonts or repetitive vertical scrolling, may invoke symptoms of optokinetic nystagmus, which is an involuntary eye reflex further enhanced by eye strain, which may also negatively affect reading performance. Nystagmus may arise regardless of font selection, however, due to eye strain induced by scrolling alone. The viewing environment issues (external lighting and monitor quality) may be considered noise factors in measuring readability, requiring controlled experimentation and statistical analysis. The intent of the publisher of the document is, presumably, to present information appropriately by predetermined font selections. Due to individual viewer preferences and environment factors, such intentions may well result in a higher rate of eye strain and reduced readability than normally considered or assumed.

Prior art often permits the viewer to adjust the size(s) of the type font used to render the document on-screen. The effort to discover and use methods to modify font size may discourage their use. More significantly, the presentation layout principles incorporated in the prior art are often inadequate to desirably fulfill viewer requirements to improve readability through font size modification. As an example, consider the implementation of multiple columns for a recent release of a web browser: the number of columns is prescribed by the web page author and cannot be modified by the viewer. As the viewer overrides the publisher's font selections in order to significantly enlarge font sizes for his own particular situation, the quality of the layout can be compromised. For instance, lines of text can easily contain too few characters, with large gaps for words that might preferably be hyphenated. In addition, there is a disproportionate increase in the rate of retracing and the amount of requisite scrolling. All this results in a substantial reduction in readability.

Similarly, when a person engages in reading a lengthy publication, a natural tendency is to settle back in the chair for comfort. When reading printed material, this is generally a well-supported activity; unless the publication itself is too heavy, the reading distance is easily maintained. For on-screen consumption of information, however, reading distance is not easily maintained even with laptop computers. Viewers could clearly benefit by simply increasing font sizes in proportion to the increased reading distances afforded by more comfortable sitting positions. However, the practical difficulties in accomplishing this simple goal with prior art are quite apparently rather significant. Font size modifications by the viewer, in and of themselves, are generally inadequate to enhance readability using the prior art.

Thus, what is needed is a system for enhancing the readability of on-screen presentations of information. Such a system would eliminate the need for scrolling. It would also limit the line widths of readable text to a useful range. It would also allow the viewer to easily modify font size and apply better presentation layout principles to preserve and enhance on-screen consumption of information.

SUMMARY OF THE INVENTION

An improved system is provided for on-screen publishing of documents, including combinations of text, graphics, and tables, to the consumer. The key features of this system include: precluding the use of window scrolling, to accommodate information too extensive to be displayed at one time, through the use of page-turning techniques; conforming this information to multiple columns to enhance readability; and integrating, in the multiple column layout on the on-screen presentation, font resizing operations conducted by the information consumer.

More specifically, an improved computer system is provided for automatically converting a scrollable electronic document, including text, graphics, tables and combinations thereof, from a scrollable format to a non-scrollable format, the system comprising a page-forming mechanism configured to operatively and automatically arrange the scrollable electronic information document into a plurality of non-scrollable pages, each having one or more columns wherein each of the columns has a width corresponding to a number of characters per line within a predetermined range of characters per line; a screen having a display window configured to simultaneously display a selected one of the plurality of non-scrollable pages in its entirety; and a page-turning mechanism configured to selectively, sequentially and individually display the plurality of non-scrollable pages in the display window. The page-forming mechanism may include a content formatter mechanism that is configured to be operatively responsive to formatting commands, either common word-processing commands or html commands or both, embedded in the electronic document. The page-forming mechanism includes a font-sizing mechanism configured to operatively permit a user to selectively alter the size of the characters comprising the non-scrollable pages. Also, the system includes an image sizing mechanism configured either to automatically alter the widths of graphic images and tables in the electronic document to proportionately conform to the width of the one or more columns, or to reduce the graphic images and tables to selectively expandable icons positioned in the displayed document.

Briefly, a first described embodiment of the present invention is configured to manipulate text utilizing common word-processing commands and graphics images embedded in a source document, whereas a modified embodiment thereof is configured to additionally manipulate tables and utilize html commands embedded in the source document.

A method is provided for practicing the invention.

PRINCIPAL OBJECTS AND ADVANTAGES OF THE INVENTION

The principal objects and advantages of the present invention include: providing a system and method for eliminating scrolling while viewing lengthy material on a monitor; providing such a system and method that establishes a maximum line width for text intended to be read by a user; providing such a system and method for permitting a user to selectively enlarge information printed in small fonts such that the material can be easily read while the user sits at a comfortable viewing distance from the monitor; providing such a system and method for automatically recalculating the number of displayed columns in response to a user change in size of displayed font; providing such a system and method for automatically reformatting displayed material in response to a user change in size of displayed font; providing such a system and method for automatically resizing graphics images embedded in a source document to fit within a column; providing such a system and method for automatically converting graphics images embedded in a source document to an icon or object image that is selectively expandable and reconvertable to the originally intended image; providing such a system and method for automatically resizing tables embedded in a source document to fit within a column; providing such a system and method for automatically converting tables embedded in a source document to an icon or object image that is selectively expandable and reconvertable to the originally intended table display; and is generally providing such a system and method that is efficient in operation, reliable in performance, capable of long operating life, and is particularly well adapted for the proposed usage thereof.

Other objects and advantages of the present invention will become apparent from the following description taken in conjunction with the accompanying drawings, which constitute a part of this specification and wherein are set forth exemplary embodiments of the present invention to illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
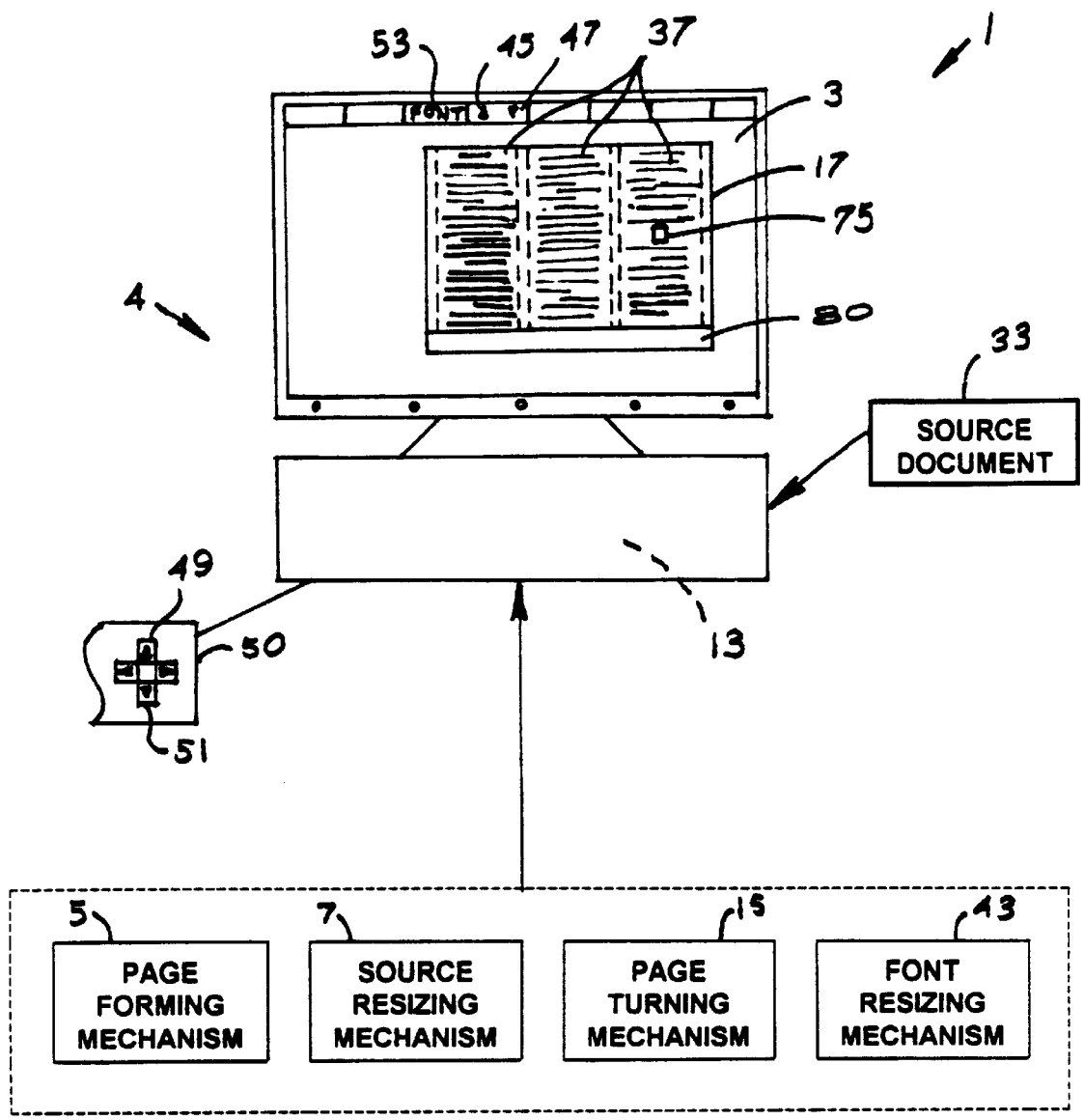
FIG. 1 is a schematic representation of a display control system for converting a scrollable computer display to a non-scrollable columnar computer display, according to the present invention.
Figure 2:
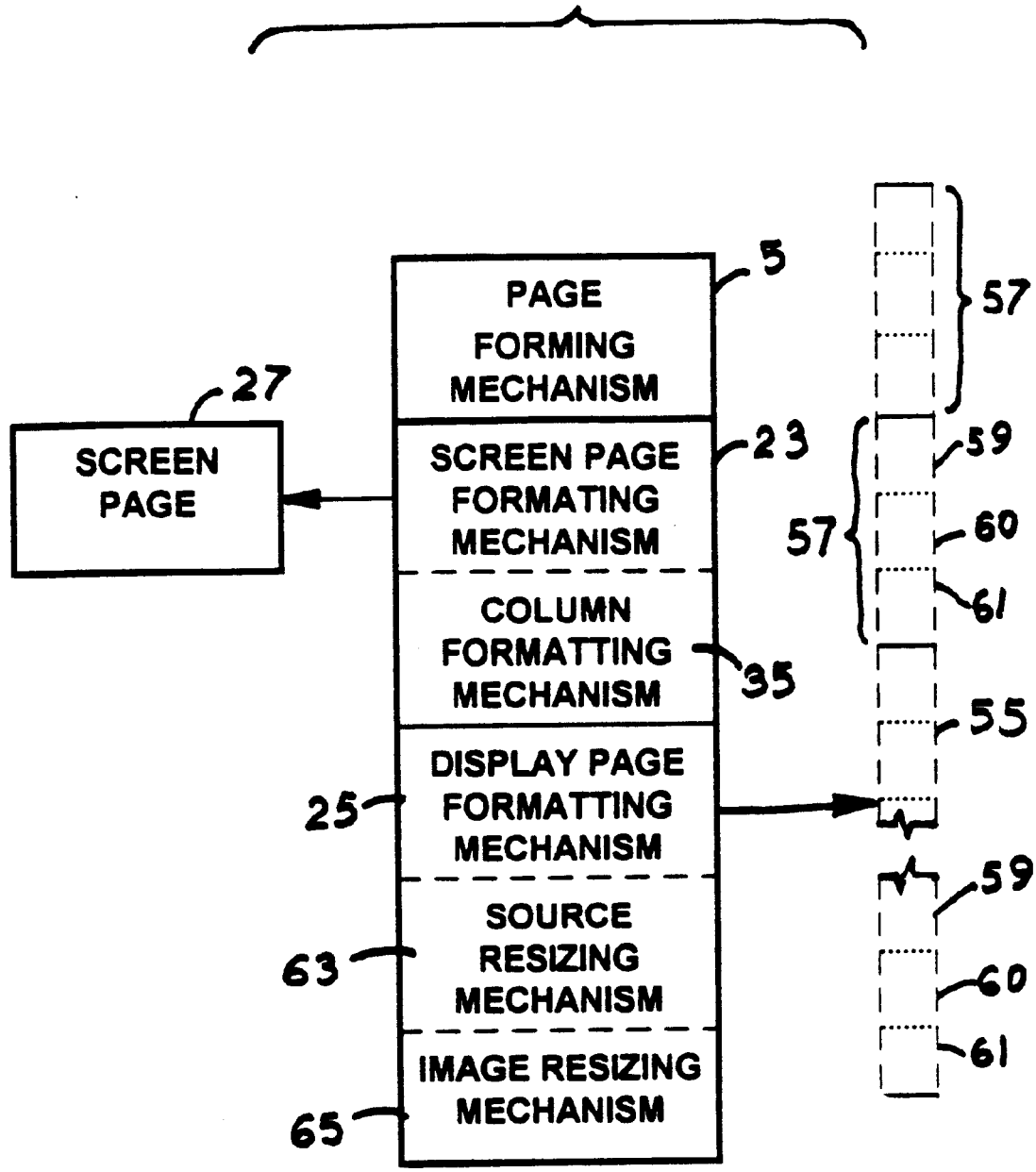
FIG. 2 is a more detailed schematic representation of the display control system.
Figure 3:
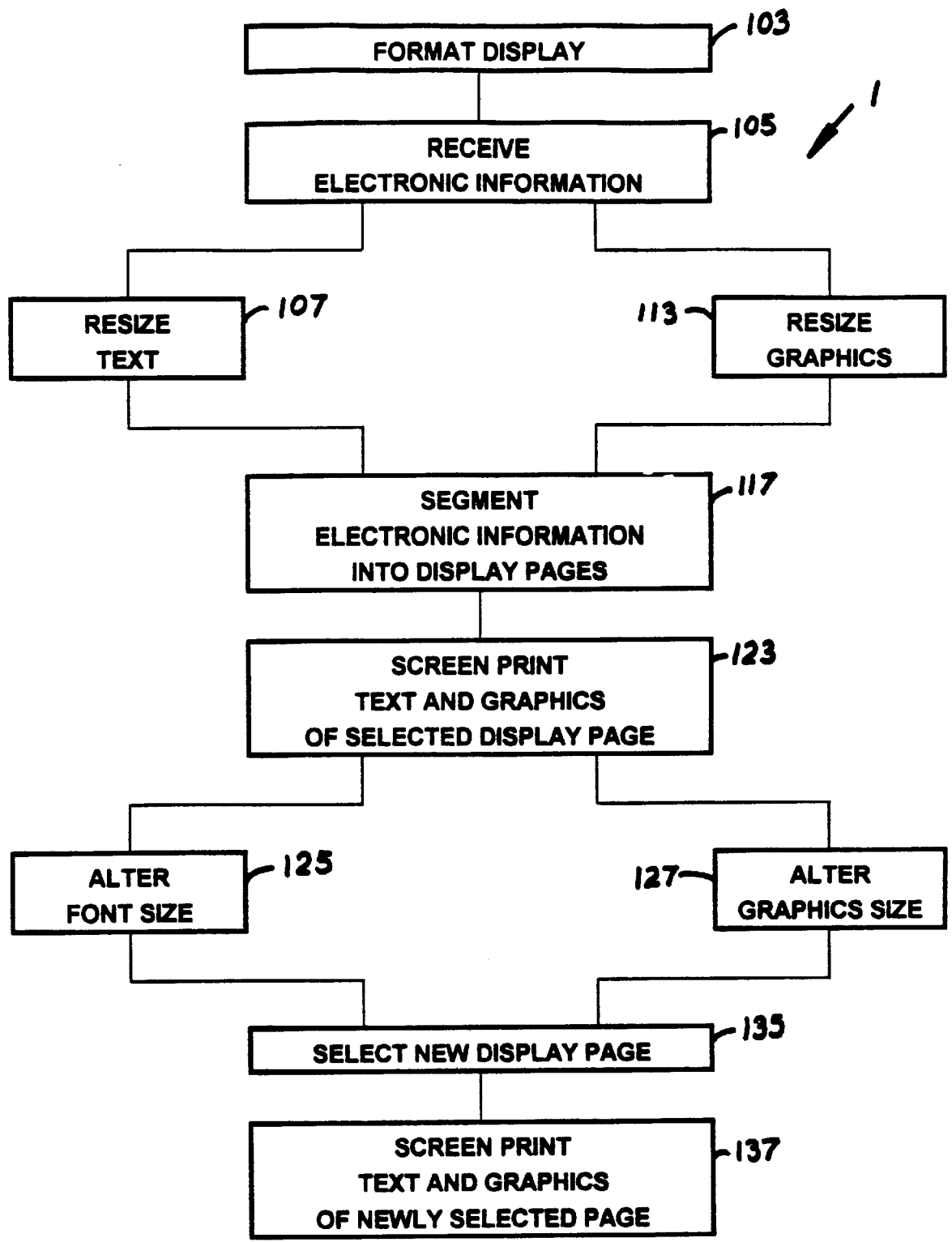
FIG. 3 is a schematic representation of an application of the display control system, according to the present invention.

The reference numeral 1 generally refers to a display control system in accordance with the present invention, as shown in FIGS. 1 through 3. The system 1 generally comprises a screen 3, a page-forming mechanism 5, a resizing mechanism 7, a screen-printing mechanism 13, and paging means such as in the form of a page-turning mechanism 15.

It is to be understood that the system 1 includes various software algorithms, commonly known to persons skilled in the programming art, which, in combination with each other and with various devices and components, also known to those having skill in the computer hardware and software arts, provide the various objectives and benefits of the present invention, as hereinafter described. A printout of the computer source code for realizing the objects and advantages of the system 1 is attached hereto as Appendix A, which is incorporated herein by reference.

The screen 3 generally includes a display window 17, wherein the display window 17 may include the entire viewing area of the screen 3 or may include only a smaller, selected portion of the available viewing area of the screen 3, as suggested in FIG. 1. It is to be understood that the screen 3 may be the displayable component of a cathode ray tube type of monitor, or may be any other type of monitor used for displaying information electronically.

First formatting means, such as in the form of a screen page formatting mechanism 23 of the page-forming mechanism 5, is configured to form a screen page 27 dimensioned to fit within the viewing area of the display window 17 and to thereby limit the quantity of electronic information available for printing to the screen 3 to only enough electronic information which will fit within the viewing area of the display window 17. In other words, the amount of information available for the screen 3 at any given time can be written in its entirety within the display window 17, as hereinafter described.

The screen page formatting mechanism 23 is configured to automatically determine the manner in which electronic information, sometimes referred to herein as source document 33, will be displayed in the display window 17. The screen page formatting mechanism 23 automatically determines the display capabilities available within the display window 17, such as number of pixels comprising a horizontal line of the display window 17, for example. Generally, the system is preset to utilize a user-selected font, such as Times New Roman for example, and a user-selected font size, such as 12- or 14-point type or other desirable fontsize, sometimes referred to herein as the "base font", wherein the current base font is the font currently selected by the user for presentation of the document. It is to be understood that the font size is further adjustable in size by the user as hereinafter described.

The screen page formatting mechanism 23 includes column determining means, such as in the form of a column formatting mechanism 35, that, after first determining the maximum number of columns 37 having certain desired width characteristics, is configured to automatically format the screen page 27 into that maximum number of columns 37.

The system 1 also includes a font-sizing mechanism 43, which allows the user to selectively increase the size of the selected font by progressively mouse-clicking on a designated font-size enlarging button 45, or to selectively decrease the size of the selected font by progressively mouse-clicking on a corresponding font-size reducing button 47. In addition, the system 1 may also be configured to enlarge the font size by keypressing the "up arrow button" 49 of a keyboard 50 of the system 1, and reduce the font size by keypressing the "down arrow button" 51 of the keyboard 50.

Alternately or additionally, the system 1 may include a font-size pull-down menu 53 or other suitable arrangement wherein a particular size of font may be directly selected without having to progressively enlarge or progressively reduce the font size with the font size enlarging and reducing buttons 45 and 47. Of course, any change in the size of the font may alter the maximum number of the columns 37 that can be displayed in the display window 17 while retaining desired width characteristics for the columns 37. As a result and in response to a change in the font size, the screen page formatting mechanism 23 is configured to automatically recalculate the new maximum number of the columns 37 having the desired width characteristics that is displayable in the display window 17, and the column formatting mechanism 35 is configured to automatically reformat the screen page 27 accordingly.

Examples of computer code to implement the font changing means of the present invention include: interpreting activation of the font size enlarging and reducing buttons 45, 47 as change-font-size changing commands shown in Appendix A, beginning at page 10, line 20; interpreting "up" and "down" arrow key presses of a keyboard of the computer system 4 as change-font-size commands shown in Appendix A, beginning at page 10, line 42; responding to user commands to step font size up or down shown in Appendix A, beginning at page 14, line 32; incrementing the base font size up or down by one index value shown in Appendix A, beginning at page 13, line 8; and setting base and footer fonts according to new current font size index shown in Appendix A, beginning at page 14, line 42.

Second formatting means, such as in the form of a display page formatting mechanism 25 of the page-forming mechanism 5, includes a source resizing mechanism 63 configured to automatically enlarge or reduce, as appropriate, the size of the font of all text of the source document 33 to conform to the size of font selected by the font-sizing mechanism 43, as hereinbefore described. The display page formatting mechanism 25 is further configured to automatically divide the scrollable source document 33 into a segmented display document 55, each segment 57 comprising one of a plurality of sequential display pages 57, each of which display pages 57 comprises only enough material from the source document 33 to partially or totally fill each of the columns 37 of the screen page 27, as suggested by the portions designated by the numerals 59, 60, 61 in FIG. 2, as an example wherein the screen page 27 is formatted into three of the columns 37. The display page formatting mechanism 25 may also be configured to be responsive to certain in-line commands in the source document 33, such as paragraph indent, word wrap, and other common word-processing commands provided by popular word processing programs.

It is to be understood that formatting and segmenting of the display document 55 may or may not be a separate operation but, instead, may be conducted concurrently with the printing of a selected one of the display pages 57 to the screen page 27, with the system 1 automatically tracking which portions 59, 60, 61 is currently printed or being printed to the display screen 17, and which portions correspond to each of the other display pages 57.

It is also to be understood that when the font-sizing mechanism 43 is activated to alter the font size as hereinbefore described, not only does the screen page formatting mechanism 23 automatically recalculate the physical width of the columns 37 to thereby maintain the desired number of characters per line within a desired range of characters per line and also automatically reformat the new number of columns 37 into the screen page 27, the display page formatting mechanism 25 also automatically redetermines the specific text 59, 60, 61 of the source document 33 to be displayed in each of the columns 37 of each of the display pages 57.

In other words, the display page formatting mechanism 25 re-segments the display document 55 into a new set of sequential display pages 57 until reaching the end of the text or graphics elements of the source document 33. Again, each newly reformatted display page 57 contains only enough material to partially or totally fill the newly formatted columns 37 of the screen page 27, including allowing for a newly determined number of the columns 37 resulting from the change in font size implemented by the font-sizing mechanism 43.

The source resizing mechanism 63 may also include resizing means, such as in the form of an image resizing mechanism 65, configured to automatically recognize and resize graphic images contained in the source document 33. The image resizing mechanism 65 may be adapted to reduce the width of the graphic images to correspond to the width of the columns 37 in the screen page 27. Alternately, the source resizing mechanism 63 may include icon forming means wherein the image resizing mechanism 65 may be configured to convert each of the graphic images contained in the source document 33 to a respective icon 75 and displaying each of the icons 75 in close proximity to text in the display document 55 that was positioned near the respective graphic image in the source document 33. In that event, the source resizing mechanism 63 includes expanding means wherein the image resizing mechanism 65 is configured to automatically expand a selected graphic image to its originally intended display size by a simple command, such as mouse-clicking the respective icon 75 for example.

Displaying means, such as in the form of the screen printing mechanism 13, is configured to print a selected one of the display pages 57 to the screen page 27 by methods commonly known in the related art.

The page-turning mechanism 15 is configured to individually and sequentially, either forwardly or backwardly, page through the display pages 57 such that all information of the source document 33 is selectively cycled, without scrolling, into the user's view on the screen 3, a display page 57 at time. In other words, the page turning mechanism 15 is adapted to replace a currently displayed display page 57 with any previous or subsequent display page 57 of the display document 55 in response to a user request to display any such previous or subsequent display page 57. By this arrangement, the system 1 eliminates the need to scroll information displayed in the display window 17 since the display area required to display the information contained in any selected display page 57 does not exceed the display area provided by the columns 37 of the screen page 27.

In an application of the present invention, the screen page formatting mechanism 23 automatically determines the display capability of the display window 17 in which the information contained in the source document 33 is to be displayed. If the entire viewable area of the screen 3 is to be used for the display window 17, then the screen page formatting mechanism 23 is configured to adapt the width and height characteristics of the screen page 27 to conform to the width and height characteristics of the viewable area of the screen 3. Similarly, if the user, employing standard window sizing and placement methods appropriate to the user's computer system, desires to specify a width for the display window 17 that is smaller than the viewable width of the screen 3 and/or a height for the display window 17 that is smaller than the viewable height of the screen 3, then the screen page formatting mechanism 23 is configured to adapt the width and height characteristics of the screen page 27 to conform to the width and height characteristics of the user-desired display window 17. By so limiting the dimensions of the screen page 27, scrolling of information printed to the display window 17 is eliminated since the dimensions of the screen page 27 are fully disposed within the specified display window 17. It is to be understood that the user may also desire to place the display window 17 at a selected position on the screen 3, or from time to time change the location of the display window 17 on the screen 3. In that event, the screen printing mechanism 13 is configured to operatively and correspondingly position the screen page 27 at the same identical location of the display window 17 on the screen 3.

If desired, a small area may be selectively reserved as a footer or information area 80 along one edge of the display area for displaying information not necessarily contained in the source document 33. Of course, the representative portions 59, 60 and 61 must be adjusted accordingly. Thus, the screen page 27 has been formatted to non-scrollably display electronic information, as schematically indicated by "FORMAT DISPLAY" 103 in FIG. 3. An example of computer code for adjusting the dimensions of the screen page 27 to account for any displayed footer area is shown in Appendix A, beginning at page 14, line 56.

Next, the screen page formatting mechanism 23 of the system 1 is configured to automatically calculate the number of columns to comprise the screen page 27 by measuring the pixel width of the minimum standard line of text according to the current base font. By definition, a minimum standard line of text is comprised of a set of characters meaningfully representing the typical number of characters of text in a line of text considered to be at the short limit for comfortable reading. Generally, such a set of characters comprises a predetermined number of identical characters, such as thirty characters, more or less, with the identical characters being the lower case "n" character, or other suitable character of similar width, such short limit being well-known in the typesetting industry.

The system 1 then divides the pixel width of the display window 17 by the pixel width of the minimum standard line of text to calculate a proposed column number, the number of columns 37 assigned to be automatically formatted into the screen page 27 being either "one" or the proposed column number, whichever is greater. The screen page formatting mechanism 23 then formats the screen page 27 as an array of the columns 37, utilizing various appearance features known in the art, wherein the array of the columns 37 consists of the assigned number of the columns 37 generally have uniform width, height and separation in the screen page 27. An example of computer code for determining the number of the columns 27 for a standard range of characters per line given the width of the display window 17 is shown in Appendix A, beginning at page 25, line 8.

The system 1 is then ready to receive the source document 33, including graphics images, as schematically indicated by "RECEIVE ELECTRONIC INFORMATION" 105 in FIG. 3. The resizing mechanism 63 then resizes all text of the source document 33 to the size of the base font, as schematically indicated by "RESIZE TEXT" 107 in FIG. 3. The system 1 resizes the text elements of the source document 33 by filling the columns 37 with text elements, printing the text to the display window 17 using the base font and size while being responsive to in-line formatting commands included in the text of the source document 33, wherein the in-line formatting commands may consist of a subset of HTML tags, a subset of document formatting codes such as those provided by a word processor, or document layout specifications; breaking the lines by hyphenating words that are too long to be printed within the column width pursuant to the font metric imposed by the base font and in-line formatting rules of the system 1, or breaking the lines on word boundaries in contiguous text elements, such as for paragraph and line break inclusions, either directly indicated by paragraph or break tags or indirectly indicated, such as by outline inclusions. Then, breaking the line filling at the end of individual text element segments, as indicated either by the inclusion of graphic elements, such as the icons 75, or by the end of the source document 33.

Further, the image resizing mechanism 65 converts graphics images of the source document 33 into icons 75 or images having width dimensions not greater than the width of the columns formatted in the screen page 27, as schematically indicated by "RESIZE GRAPHICS" 113 in FIG. 3.

Resizing of a graphics image by the system 1 generally comprises: comparing the actual width of the graphic image with the available width of the column 37. If the width dimension of the graphic image exceeds the width dimension of the column 37, the width of the graphic image is proportionately reduced to fit within the width of the column 37, the height also preferentially reduced by the same proportion; if the height dimension of the graphic image exceeds the height of the column 37 of the screen page 27, the height of the graphic image is proportionately reduced to fit within the height of the column of the screen page 27, the width also preferentially reduced by the same proportion. The graphics image is then rendered as an in-line graphic element and (i) placed immediately after any prior text elements in the current line of the current column 37 of the display page 57, or (ii) if the width of the graphics image exceeds the remaining width of the current line of the current column 37 of the display page 57, placed immediately below the current line of the current column 37 of the display page 57, or (iii) if the height of the graphics image exceeds the remaining height of the current column 37 of the display page 57, placed in the next column 37 of the display page 57, or (iv) if the current column 37 is the last column 37 of the current display page 57, retained for display in the first column 37 of the next succeeding display page 57.

An example of computer code for downloading the original graphic images from a remote file, caching the graphic images, and returning the corresponding image object or icon 75 is shown in Appendix A, beginning at page 3, line 4.

It is to be understood that resizing of the text font and/or resizing of the graphics images of the source document 33 may or may not be a separate operation but, instead, may be conducted concurrently with the printing of a selected one of the display pages 57 to the screen page 27.

Thus, the resized text, with the icons 75 appropriately positioned therein such that the text either stops above each of the icons 75 and continues below each of the icons 75, or, if desired, wraps around each of the icons 75, is reformatted to essentially convert the source document 33 into the display document 55 with a width of one of the columns 37. The display page formatting mechanism 25 then equivalently segments the display document 55 into a plurality of sequential display pages 57, as schematically indicated by "SEGMENT ELECTRONIC INFORMATION INTO DISPLAY PAGES" 117 in FIG. 3.

Then, a selected one of the plurality of screen pages 57 is printed, either concurrently with the resizing or subsequently, to the display window 17 by the screen-printing mechanism 77, as schematically indicated by "SCREEN PRINT TEXT AND GRAPHICS OF SELECTED DISPLAY PAGE" 123 in FIG. 3. Since the quantity of information from the source document 33 printed to the screen 3 at any given time is only enough to partially or totally fill the columns 37 of the screen page 27, need for scrolling in order to see all of the information printed to the screen 3 is eliminated by the present invention. An example of computer code for printing a selected one of the display pages 57 to the display screen 17 using the current base font and the automatically calculated number of the columns 37 is shown in Appendix A, beginning at page 16, line 11. Also, an example of computer code for resizing text and graphics images and printing the current display page 57 line-by-line and word-by-word, hyphenating as needed, parsing tag-based formatting instructions for text, resizing graphics images to fit within column width, and returning end-of-tag indices is shown in Appendix A, beginning at page 18, line 3.

If desired, the user may selectively change the size of certain features of the displayed material. More specifically, one of the features selectively changeable by the user is the font size, as schematically indicated by "ALTER FONT SIZE" 125 in FIG. 3. If font size is changed, the screen page formatting mechanism 23 would be activated to reformat the screen page 27, including recalculating the number of columns 37 to be included in such reformatting, and the display page formatting mechanism 25 would be activated to develop a new segmented display document 55 corresponding to the reformatted screen page 27, as hereinbefore described. Generally, altering font size will cause the system 1 to automatically return to the display page 57 being printed to the screen page 27 to the first one of the plurality of sequential display pages 57.

Additionally, the icons 75 may be activated to expand the underlying graphics images to disclose or enlarge those features of the source document 33, as schematically indicated by "ALTER GRAPHICS SIZE" 127 in FIG. 3. Preferably, activating the icons 75 does not cause the system 1 to return to the first one of the plurality of sequential display pages 57 as when altering the font size.

After viewing the display page 57 being printed to the display window 17, the user may proceed to the next sequential display page 57 or the immediately preceding display page 57 as desired by activating the page-turning mechanism 15, such as selecting an appropriate pull-down menu, mouse-clicking a designated button, or other suitable arrangement, as schematically indicated by "SELECT NEW DISPLAY PAGE" 135 in FIG. 3. As a result, a corresponding one of the plurality of display pages 57 is printed to the screen page 27, as schematically indicated by "SCREEN PRINT TEXT AND GRAPHICS OF NEWLY SELECTED PAGE" 137 in FIG. 3. Again, scrolling of the information displayed in the display window 17 is eliminated since the display area required to display the information contained in each display page 57 is not greater than the available display area provided by the columns 37 of the screen page 27.

In other words, the system 1 may provide an expedited method for changing font size while maintaining readability by maintaining a standard number of characters per line, as follows: (i) changing font size steps by accepting user input for stepping base font size up or down, keyboard input (e.g. up or down arrow keys), or graphical user interface "button" elements 45, 47; (ii) limiting the range of base font sizes (e.g., 8-point to 96-point fonts), (iii) limiting user input to defined range of font sizes, or (iv) modifying the base font size. Then, maintaining readability by (i) recalculating the number of columns 37 for the displayed font size using the newly current base font size as hereinbefore described for calculating the number of columns 37 for the displayed font size, (ii) recomposing the screen page 27 in accordance with the recalculated number of columns 37 as hereinbefore described for composing the screen page 27 as an array of columns 34; and (iii) resizing text and graphics in accordance with the recomposition of the screen page 27 as hereinbefore described for resizing of text elements and resizing of graphics images.

Figure 4:
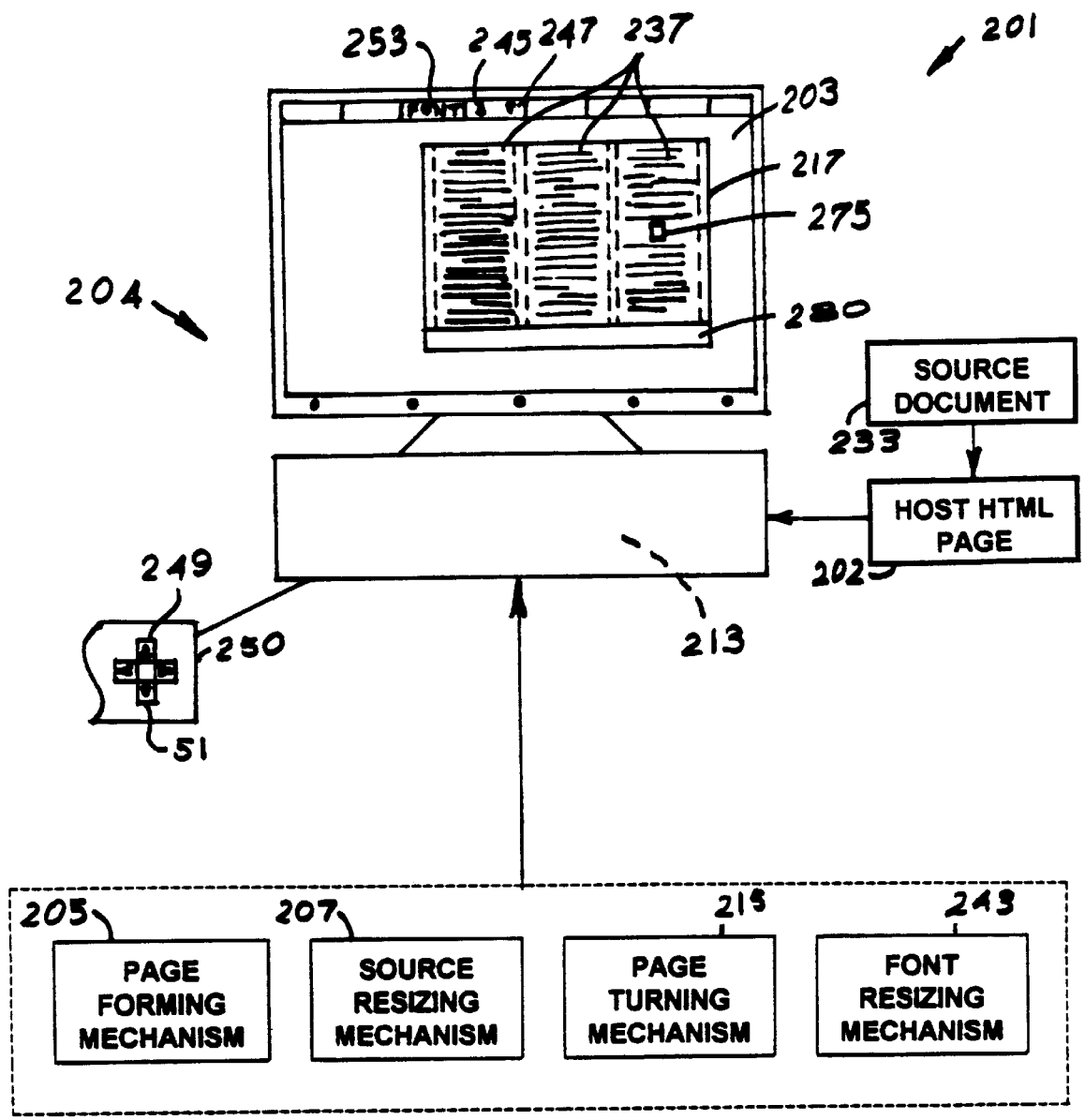
FIG. 4 is a schematic representation of a modified embodiment of the display control system, according to the present invention.
Figure 5:
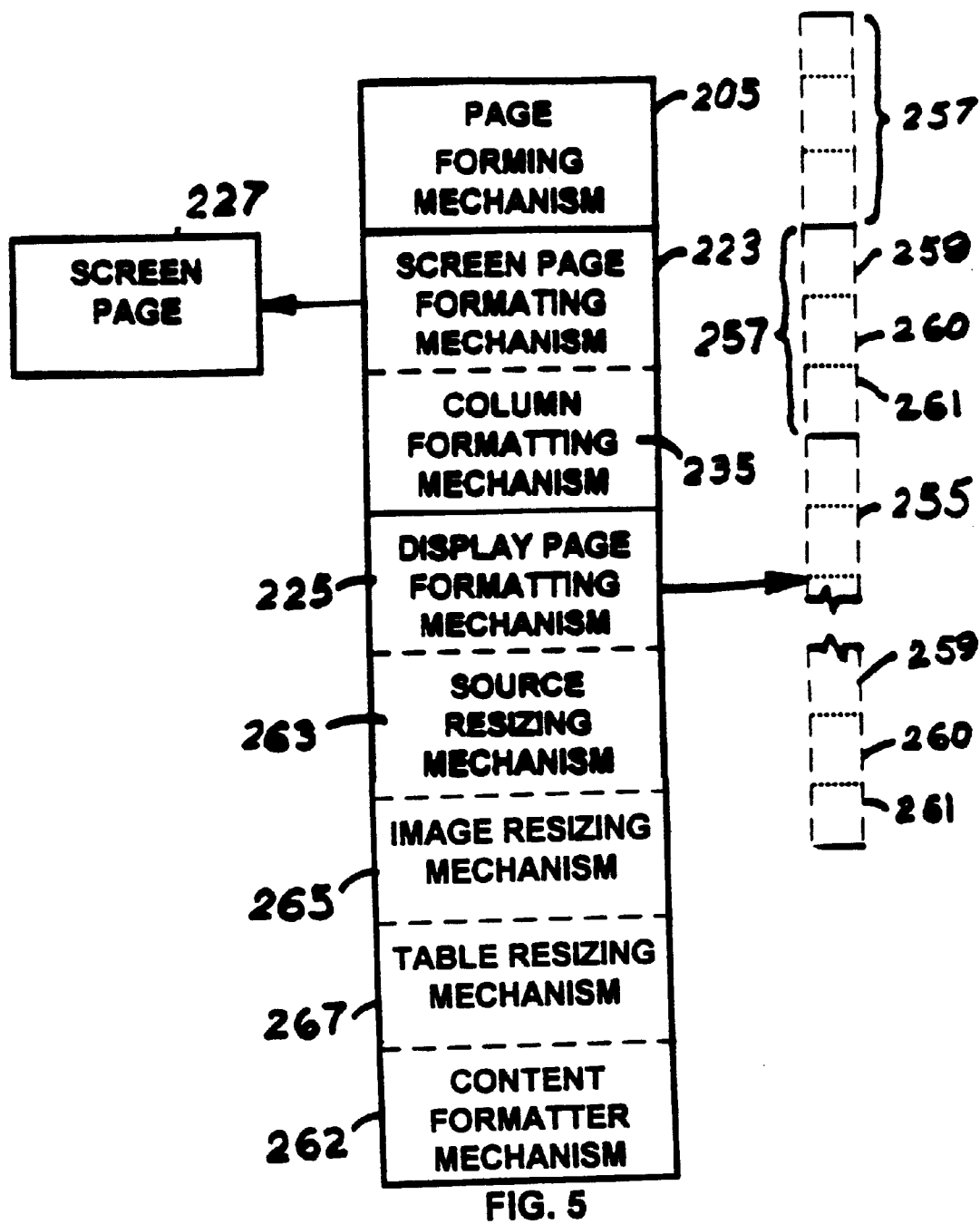
FIG. 5 is a more detailed schematic representation of the modified embodiment of the display control system.
Figure 6:
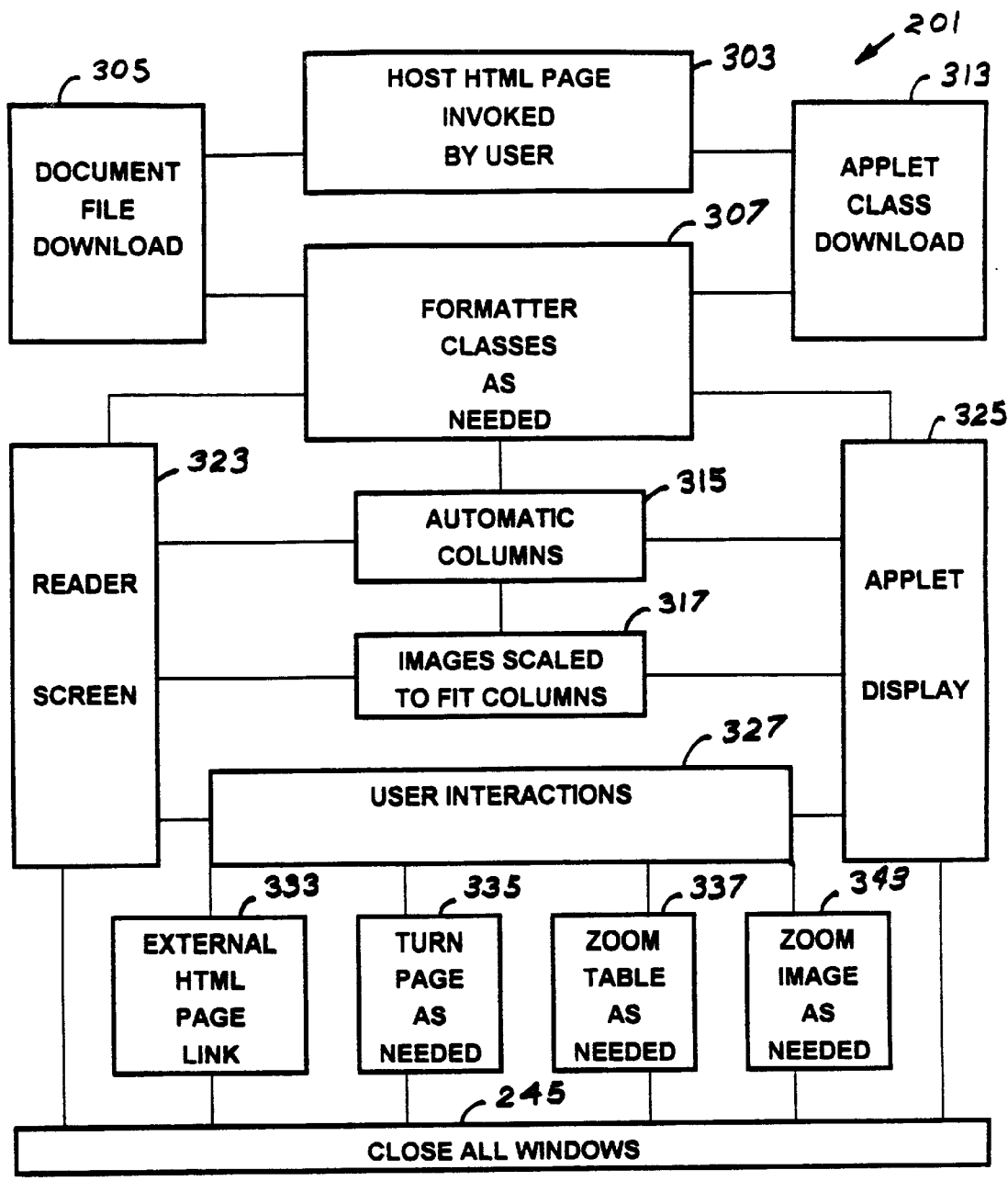
FIG. 6 is a schematic representation of an application of the modified embodiment of the display control system, according to the present invention.

A modified embodiment of the display control system for converting a scrollable computer display to a non-scrollable columnar computer display, in accordance with the present invention, is shown in FIGS. 4 through 6, and is generally designated herein by the numeral 201. A printout of the computer source code for realizing the objects and advantages of the modified embodiment 201 is attached hereto as Appendix B, which is incorporated herein by reference. The primary difference between the modified embodiment 201 and the embodiment 1 previously described herein in the adaption of the present invention to support the extensive range of document formatting syntax possible with standard HTML, by utilizing numerous specialized methods for formatting in accord therewith. Many of the characteristics of the modified embodiment 201 are substantially similar to those of the previously described embodiment 1 and will not be reiterated here in detail.

The system 201 generally comprises a screen 203 of a computer system 204, a page-forming mechanism 205, a display sizing mechanism 207, and a page-turning mechanism 215. The page-forming mechanism 205 includes a screen page formatting mechanism 223 and a display page formatting mechanism 225. The screen page formatting mechanism 223 is configured to form a screen page 27 dimensioned to fit within a display window 217.

The screen page formatting mechanism 223 is configured to automatically determine the manner in which a source document 233, will be displayed in the display window 217. The screen page formatting mechanism 223 includes a column formatting mechanism 235 that, after first determining the maximum number of columns 237 having certain desired width characteristics, is configured to automatically format the screen page 227 into that maximum number of the columns 237.

The system 201 also includes a font-sizing mechanism 243, which allows the user to selectively increase the size of the selected font by progressively mouse-clicking on a designated font-size enlarging button 245, or to selectively decrease the size of the selected font by progressively mouse-clicking on a corresponding font-size reducing button 247. In addition, the system 1 may also be configured to recognize a keypress of the "up arrow button" 249 of a keyboard 250 of the system 201 as a command to enlarge the font size, and a keypress of the "down arrow button" 251 of the keyboard 250 as a command to reduce the size of the font.

Alternately or additionally, the system 1 may include a font-size pull-down menu 253 or other suitable arrangement wherein a particular size of font may be directly selected without having to progressively enlarge or progressively reduce the font size with the font-size enlarging and reducing buttons 245, 247, or the "up" and "down" arrow keys 249, 251. In response to a change in the font size, the screen page formatting mechanism 223 is configured to automatically recalculate the new maximum number of the columns 237 having the desired width characteristics that is displayable in the display window 217, and the column formatting mechanism 235 is configured to automatically reformat the screen page 227 accordingly.

Examples of computer code for determining the number of the columns for a standard range of characters per line given the width of the display window is shown in Appendix B, beginning at page 30, line 69 and page 31, line 5; for determining the minimum value of the width of the standard range of characters per line given the current base font size is shown in Appendix B, beginning at page 49, line 41; for interpreting "up arrow" and "down arrow" key presses on the computer keyboard as change-font-size commands is shown in Appendix B, beginning at page 54, line 61; for interpreting activation of font increasing and font decreasing buttons as change-font-size commands is shown in Appendix B, beginning at page 52, lines 25 and 64; for responding to user commands for stepping font size up or down is shown in Appendix B, beginning at page 32, line 12 and page 54, line 8; for incrementing base font size up or down by one index value is shown in Appendix B, beginning at page 50, line 3; and for setting base font size to a new index value within certain font size limits is shown in Appendix B, beginning at page 48, line 50.

The display page formatting mechanism 225 includes a source resizing mechanism 263 configured to automatically enlarge or reduce, as appropriate, the size of the font of all text of the source document 233 to conform to the size of font selected by the font-sizing mechanism 243, as hereinbefore described. The display page formatting mechanism 225 is further configured to automatically divide the scrollable source document 233 into a segmented display document 255, each segment 257 thereof comprising one of a plurality of sequential display pages 257, each of which display pages 257 comprises only enough material from the source document 233 to partially or totally fill each of the columns 237 of the screen page 227, as suggested by the portions designated by the numerals 259, 260, 261 in FIG. 5, as an example wherein the screen page 227 is formatted into three of the columns 237. The display page formatting mechanism 225 may also include a content formatter mechanism 262 that is configured to be operatively responsive to formatting commands embedded in the source document 233, such as text color, style, font, font size, table and form specifications, etc., as well as paragraph indent, word wrap, and other common word-processing commands provided by popular word processing programs.

The source resizing mechanism 263 may also include an image resizing mechanism 265 and a table resizing mechanism 267 configured to automatically recognize and resize graphic images and tables, respectively, contained in the source document 233. The image and table resizing mechanisms 265, 267 may be adapted to reduce the width of the graphic images and the tables to correspond to the width of the columns 237 in the screen page 227. Alternately, the image and table resizing mechanisms 265, 267 may be configured to convert each of the graphic images and the tables contained in the source document 233 to a respective icon 275 and displaying each of the icons 275 in close proximity to text in the display document 255 that was positioned near the respective graphic image or table in the source document 233. In that event, the image and table resizing mechanisms 265, 267 are configured to automatically expand a selected graphic image or table to its originally intended display size by a simple command, such as mouse-clicking the respective icon 275 for example.

Resizing of a table by the system 201 generally comprises the steps of: rendering the table as an in-line element and (i) placing the table immediately after any prior text or graphic elements in the current line of the current column 237 of the display page 257; or (ii) if the preferred width of the table exceeds the remaining width of the current line of the current column 237 of the display page 257, placing the table immediately below the current line in the current column 237 of the display page 257; or (iii) if the minimum height of the table exceeds the remaining height of the current column 237 of the display page 257, placing the table in the next column 237 of the display page 257, or (iv) if the current column 237 is the last column 237 of the current display page 257, retaining the table for display in the first column 237 of the next succeeding display page 257.

Rendering of the table by the system 201 comprises the steps of: (i) creating a grid array with an adequate number of rows and columns for the table specifications as determined by the source document 233 or other reference data; and (ii) filling the cells of the grid with the table entry data as specified by the source document 233 or other reference source, wherein the cells comprise resized text, graphics, and table elements adapted to the allocated dimensions of the cells.

The screen printing mechanism 213 is configured to print a selected one of the display pages 57 to the screen page 227. Examples of computer code for printing a selected one of the display pages to the display screen using the current base font and the automatically calculated number of the columns is shown in Appendix B, beginning at page 43, lines 17, 36 and 48; for adjusting the dimensions of the screen page to account for any footer area displayed is shown in Appendix B, beginning at page 49, lines 8 and 17; for resizing of text elements and printing the current display page to the display screen is shown in Appendix B, beginning at page 38, line 16; for parsing html tag-based formatting instructions for text, graphics and tables, and returning end-of-tag indices is shown in Appendix B, beginning at page 24, line 64; for sending blocks of text to be drawn on the display window including measuring text word-by-word, hyphenating as needed, adding words to be printed to a row of text and graphics, and returning a boolean when all words in the block of text have been handled is shown in Appendix B, beginning at page 23, line 29; for sending words to be drawn of the display table including converting html character entities if any, adding words to a cache for printing a row of text and graphics, and determining the width of the word is shown in Appendix B, beginning at page 30, line 9; for drawing lines composed of text, graphics, and table elements including accounting for heights, offsets and widths of all row elements, printing each to the display screen, adding Java components as required, and returning end-of-content indices is shown in Appendix B, beginning at page 40, line 17; for resizing graphics elements including downloading original graphic images from file, caching images for future use, and returning image objects or icons is shown in Appendix B, beginning at page 71, line 60; for accounting for column width and height to determine image scale-down factor if any, and returning widths of rendered images is shown in Appendix B, beginning at page 70, line 59; for rendering table elements including printing the table to the display screen is shown in Appendix B, beginning at page 88, line 4; for creating an array of rows and columns according to html table specifications is shown in Appendix B, beginning at page 84, line 23; for resizing tables to fit column width and height limits, and returning end-of-tag indices is shown in Appendix B, beginning at page 77, line 31; for setting base and footer fonts according to a new size index is shown in Appendiix B, beginning at page 48, line 20; and for setting base font color and metrics is shown in Appendix B, beginning at page 48, lines 31 and 37.

The page-turning mechanism 215 is configured to individually and sequentially, either forwardly or backwardly, page through the display pages 257 such that all information of the source document 233 is selectively cycled, without scrolling, into the user's view on the screen 203, a display page 257 at time.

In an application of the modified embodiment 201 of the present invention, a user connects to a host html page of a client system, as schematically indicated by "HOST HTML PAGE INVOKED BY USER" 303 in FIG. 6, and a selected document file, namely the source document 233, is downloaded therethrough as schematically indicated by "DOCUMENT FILE DOWNLOAD" 305. The system 201 is configured to parse the source document 233 and automatically determine the specialized Java class applets needed to render the source document 233 as schematically indicated by "FORMATTER CLASSES AS NEEDED" 307. The appropriate applet classes are then accessed by the system 201, either locally from the computer system 204 or downloaded through the html page, as schematically indicated by "APPLET CLASS DOWNLOAD" 313.

The system 201 then, cooperatively with the downloaded applet classes, automatically formats the columns 237 as schematically indicated by "AUTOMATIC COLUMNS" 315, and automatically scales graphics images and tables to fit the columns 237 as schematically indicated by "IMAGES SCALED TO FIT COLUMNS" 317. The system 201 is configured to directly print a selected one of the display pages 255 to the columns 237 of the screen page 227 and, therefore, to the display screen 217, as indicated schematically by "READER SCREEN" 323, to form an applet display as schematically indicated by "APPLET DISPLAY" 325, or a combination of the two.

The user may then selectively interact with the system 201 as schematically indicated by "USER INTERAC- TIONS" 327, including making further connections through the html page as indicated by "EXTERNAL HTML PAGE LINK" 333, selectively and individually viewing other display pages 257 of the display document 255 as schematically indicated by "TURN PAGE AS NEEDED" 335, and enlarging a table or graphics image by mouse-clicking on the reduced display thereof or by mouse-clicking on the corresponding icon 275, as appropriate, as schematically indicated by "ZOOM TABLE AS NEEDED" 337 and "ZOOM IMAGE AS NEEDED" 343 in FIG. 6. Of course, after completion of the exercise, the user causes the system 201 to "CLOSE ALL WINDOWS" 245.

Summarizing, the present invention provides an expedited method for changing font size while maintaining readability by maintaining a standard number of characters per line, as follows: (i) changing font size steps by accepting user input for stepping base font size up or down, keyboard input (e.g. up or down arrow keys), or graphical user interface "button" elements; (ii) limiting the range of base font sizes (e.g., 8-point to 96-point fonts), (iii) limiting user input to defined range of font sizes, or (iv) modifying the base font size. Then, maintaining readability by (i) recalculating the number of columns for the displayed font size using the newly current base font size as hereinbefore described for calculating the number of columns based on the available display window width and the selected display font size, (ii) recomposing the screen page in accordance with the recalculated number of columns as hereinbefore described for composing the screen page as an array of columns; and (iii) resizing text, graphics, and tables in accordance with the recomposition of the screen page as hereinbefore described for resizing of text elements, resizing of graphics images, and resizing of tables.

In addition to the foregoing, other techniques may be used in combination therewith to further reduce eye strain of a user viewing a monitor utilizing the screen control display system. For example, background and desirable contrasting text, etc., colors may be selected including gray scales, as appropriate.

Simply stated, features provided by the present invention include the ability to pull up text, a graphic image or a table into its own separate window with a single mouse click on the selected material, and the appearance of the electronic information on the screen is document dependent instead of the appearance being software dependent, which allows a viewer to control and maintain the appearance of the document in a more readable form, regardless of how the author of the electronic information set up that document originally. These features, in combination, have the effect of reducing eye strain in on-monitor reading and viewing of text and graphics by measurably reducing optokinetic nystagmus and/or measurably reducing eye squinting.

It is to be understood that while certain forms of the present invention have been illustrated and described herein, it is not to be limited to the specific forms or arrangement of parts described and shown.

What is claimed and desired to be secured by Letters Patent is as follows:

1. A system for generating a source in a non-scrolling format for display in a display window having a user-selectable dimension using a processor comprising:
    a screen page formatting mechanism configured to form a screen page dimensioned to fit the display window, to calculate a number of columns that will fit within the screen page, each column having a width characteristic, and to format the screen page for the number of columns; and
    a display page formatting mechanism configured to format the source as a display document having a base font characteristic and a plurality of display pages each non-scrollably displayable for the screen page and to dynamically reformat the display document for a plurality of other display pages upon selection of a user selected font characteristic and the user-selected dimension each of the other display pages non-scrollably displayable for the screen page.

2. The system of claim 1 wherein the width characteristic comprises a range of a number of characters per line.

3. The system of claim 1 wherein the display document comprises text.

4. The system of claim 1 wherein the display page formatting mechanism further is configured to identify an in-line command in the source and to format the display document according to the in-line command.

5. The system of claim 1 further comprising an image resizing mechanism configured to resize a graphic image from the source to fit within at least one column of the display document.

6. The system of claim 1 further comprising an image resizing mechanism configured to convert a graphic image from the source to an icon displayable within at least one column of the display document.

7. The system of claim 6 wherein the image resizing mechanism further is configured to expand the icon to an original size of the graphic image when the icon is selected.

8. The system of claim 1 further comprising a formatting mechanism configured to be responsive to a formatting command embedded in the source to format a portion of at least one display page according to the formatting command.

9. The system of claim 8 wherein the formatting command comprises a hypertext markup language tag-based formatting instruction.

10. The system of claim 1 wherein the display page is generated for display as a hypertext markup language page.

11. The system of claim 1 wherein the display page is generated for display as a web-based page.

12. The system of claim 1 further comprising a table resizing mechanism configured to convert a table from the source to an icon displayable within at least one column of the display document.

13. The system of claim 1 further comprising a table resizing mechanism configured to reduce a table from the source to be displayable within at least one column of the display document.

14. The system of claim 1 wherein the number of columns comprises one.

15. The system of claim 1 wherein the number of columns comprises more than one.

16. A system for generating a source in a non-scrolling format for display in a display window having a user-selectable dimension using a processor comprising:
    a screen page formatting mechanism configured to form a screen page dimensioned to fit the display window; and
    a display page formatting mechanism configured to format the source as a display document having a base font characteristic an a plurality of display pages each non-scrollably displayable for the screen page and to dynamically reformat the source for a plurality of other display pages upon selection of a user selected font characteristic and the user-selected dimension, each of the other display pages non-scrollably displayable for the screen page.

17. The system of claim 16 further comprising a column formatting mechanism configured to determine a number of columns having a width characteristic that can fit within the display window and to format the screen page for the number of columns.

18. The system of claim 16 wherein the display document comprises text.

19. The system of claim 16 wherein the display page formatting mechanism further is configured to identify an in-line command in the source and to format the display document according to the in-line command.

20. The system of claim 16 further comprising a formatting mechanism configured to be responsive to a formatting command embedded in the source to format a portion of at least one display page according to the formatting command.

21. The system of claim 20 wherein the formatting command comprises a hypertext markup language tag-based formatting instruction.

22. The system of claim 16 wherein the display page is generated for display as a hypertext markup language page.

23. The system of claim 16 wherein the display page is generated for display as a web-based page.

24. A system for generating a source in a non-scrolling format for display in a display window having a user-selectable dimension using a processor comprising:

a screen page formatting mechanism configured to form a screen page dimensioned to fit the display window; and a display page formatting mechanism configured to format the source as a display document having a base font characteristic and a plurality of display pages each non-scrollably displayable for the screen page and to fill the screen page with at least one display page, to dynamically reformat the display document for a plurality of other display pages upon selection of a user selected font characteristic and the user-selected dimension, each of the other display pages non-scrollably displayable for the screen page, and to fill the screen page with at least one of the other display pages.

25. The system of claim 24 wherein the screen formatting mechanism further is configured to determine a display capability of a display window.

26. The system of claim 24 further comprising a column formatting mechanism configured to determine a number of columns having a width characteristic that can fit within the display window and to format the screen page for the number of columns.

27. The system of claim 26 wherein the width characteristic comprises a range of a number of characters per line.

28. The system of claim 26 wherein the number of columns comprises one.

29. The system of claim 26 wherein the number of columns comprises more than one.

30. The system of claim 24 further comprising a font sizing mechanism configured to enable selectively increasing or decreasing a selected font size of the display document.

31. The system of claim 30 wherein the screen page formatting mechanism further is configured to recalculate a new number of columns having the width characteristic that will fit within the screen page when the font size is changed and to reformat the screen page for the new number of columns.

32. The system of claim 30 wherein the screen page formatting mechanism further is configured to recalculate a new number of columns having the width characteristic when the font size is changed, to reformat the screen page for the new number of columns, and to determine an amount of the display document to be displayed in each column.

33. The system of claim 32 wherein the page formatting mechanism further is configured to re-format the display document into a new display document having a plurality of new display pages.

34. The system of claim 24 wherein the display document comprises text.

35. The system of claim 24 wherein each of the display pages comprises a portion of the display document that partially or totally fills the screen page.

36. The system of claim 24 wherein the display page formatting mechanism further is configured to identify an in-line command in the source and to format the display document according to the in-line command.

37. The system of claim 24 further comprising an image resizing mechanism configured to resize a graphic image from the source to fit in at least one display page.

38. The system of claim 24 further comprising an image resizing mechanism configured to convert a graphic image from the source to an icon displayable within at least one display page.

39. The system of claim 38 wherein the image resizing mechanism further is configured to expand the icon to an original size of the graphic image when the icon is selected.

40. The system of claim 24 further comprising a page turning mechanism configured to generate for display, without scrolling, another page in a sequence of display pages.

41. The system of claim 24 wherein the dimension of the screen page comprises a dimension of an entire viewable area of a screen.

42. The system of claim 24 wherein the dimension of the screen page comprises a dimension less than a viewable area of a screen.

43. The system of claim 24 further comprising a screen printing mechanism configured to generate for display the screen page having the at least one display page of the display document in the display window.

44. The system of claim 24 further comprising a formatting mechanism configured to be responsive to a formatting command embedded in the source to format a portion of at least one display page according to the formatting command.

45. The system of claim 44 wherein the formatting command comprises a hypertext markup language tag-based formatting instruction.

46. The system of claim 24 wherein the display page is generated for display as a hypertext markup language page.

47. The system of claim 24 wherein the display page is generated for display as a web-based page.

48. The system of claim 24 further comprising a table resizing mechanism configured to convert a table from the source to an icon displayable within at least one display page.

49. The system of claim 24 further comprising a table resizing mechanism configured to reduce a table from the source to be displayable within at least one display page.

50. The system of claim 24 further comprising a screen printing mechanism configured to screen print the screen page to the display window.

51. A method for generating a source in a non-scrolling format for display in a display window having a user-selectable dimension using a processor comprising:

forming a screen page dimensioned to fit the display window;

calculating a number of columns having a width characteristic that will fit in the screen page;

formatting the screen page for the number of columns;

formatting the source as a display document having a base font characteristic and a plurality of display pages each non-scrollably displayable for the screen page; and dynamically reformatting the display document for a plurality of other display pages upon selection of a user selected font characteristic and the user-selected dimension, each of the other display pages non-scrollably displayable for the screen page.

52. The method of claim 51 wherein the width characteristic comprises a number of characters per line.

53. The method of claim 51 further comprising generating for display at least one of the display pages.

54. A method for generating electronic information in a non-scrolling format for display in a display window having a user-selectable dimension using a processor comprising:

forming a screen page dimensioned to fit the display window;

sizing the electronic information to a base font;

formatting the electronic information to form a display document having display pages wherein each display page is wholly displayable in the screen display;

generating for non-scrollable display at least one display page; and dynamically reformatting the display document for a plurality of other display pages upon selection of a user selected font characteristic and the user-selected dimension, each of the other display pages non-scrollably displayable for the screen page.

55. The method of claim 54 wherein the user selected font comprises a second base font.

56. The method of claim 54 wherein the electronic information comprises an image and further comprising sizing the image to fit within the display page.

57. The method of claim 54 wherein the electronic information comprises an image and further comprising converting the image to an icon for display in the display page.

58. The method of claim 54 further comprising enabling changing the selected font.

59. The method of claim 54 wherein the selected font is changed and further comprising re-formatting the electronic information to new display pages wherein each new display page is wholly displayable in the screen display.

60. The method of claim 54 wherein at least one display page is generated for display as a hypertext markup language page.

61. The method of claim 54 wherein at least one display page is generated for display as a web-based page.

62. A method for generating a source in a non-scrolling format for display in a display window having a user-selectable dimension using a processor comprising:

forming a screen page dimensioned to fit the display window;

formatting the source as a display document having a base font characteristic and a plurality of display pages each non-scrollably displayable for the screen page; and dynamically reformatting the source for a plurality of other display pages upon selection of a user selected font characteristic and the user-selected dimension, each of the other display pages non-scrollably displayable for the screen page.

63. The method of claim 62 further comprising:

determining a number of columns having a width characteristic that can fit within the display window; and formatting the screen page for the number of columns.

64. The method of claim 62 wherein the display document comprises text.

65. The method of claim 62 further comprising:

identifying an in-line command in the source; and formatting the display document according to the in-line command.

66. The method of claim 62 further comprising being responsive to a formatting command embedded in the source to format a portion of at least one display page according to the formatting command.

67. The method of claim 66 wherein the formatting command comprises a hypertext markup language tag-based formatting instruction.

68. The method of claim 62 further comprising generating the display page for display as a hypertext markup language page.

69. The method of claim 62 further comprising generating the display page for display as a web-based page.

70. A method for generating a source in a non-scrolling format for display in a display window having a user-selectable dimension using a processor comprising:

forming a screen page dimensioned to fit the display window;

formatting the source as a display document having a base font characteristic and a plurality of display pages each non-scrollably displayable for the screen page;

filling the screen page with at least one display page; and dynamically reformatting the display document for a plurality of other display pages upon selection of a user selected font characteristic and the user-selected dimension, each of the other display pages non-scrollably displayable for the screen page, and to fill the screen page with at least one of the other display pages.

71. The method of claim 70 further comprising:

determining a number of columns having a width characteristic that can fit within the display window; and formatting the screen page for the number of columns.

72. The method of claim 70 wherein the display document comprises text.

73. The method of claim 70 further comprising:

identifying an in-line command in the source; and formatting the display document according to the in-line command.

74. The method of claim 70 further comprising being responsive to a formatting command embedded in the source to format a portion of at least one display page according to the formatting command.

75. The method of claim 70 wherein the formatting command comprises a hypertext markup language tag-based formatting instruction.

76. The method of claim 70 further comprising generating the display page for display as a hypertext markup language page.

77. The method of claim 70 further comprising generating the display page for display as a web-based page.

* * * * *

US006389437C1

(12) EX PARTE REEXAMINATION CERTIFICATE (8090th)
United States Patent
Stoub

(10) Number: US 6,389,437 C1
(45) Certificate Issued: *Mar. 15, 2011

(54) SYSTEM FOR CONVERTING SCROLLING DISPLAY TO NON-SCROLLING COLUMNAR DISPLAY

(75) Inventor: Everett W. Stoub, Hillsboro, MO (US)

(73) Assignee: Ion Systems, Inc., Crystal City, MO (US)

(*) Notice: This patent issued on a continued prosecution application filed under 37 CFR 1.53(d), and is subject to the twenty year patent term provisions of 35 U.S.C. 154(a)(2).

Reexamination Request:
No. 90/008,069, Jun. 29, 2006

Reexamination Certificate for:
Patent No.: 6,389,437
Issued: May 14, 2002
Appl. No.: 09/003,972
Filed: Jan. 7, 1998

(51) Int. Cl.
*G06F 17/21* (2006.01)
*G06F 17/25* (2006.01)

(52) U.S. Cl. .................. 715/201; 707/E17.121
(58) Field of Classification Search .............. None
See application file for complete search history.

(56) References Cited

U.S. PATENT DOCUMENTS

| 4,608,664 A | 8/1986 | Bartlett et al. |
| 4,686,649 A | 8/1987 | Rush et al. |
| 4,709,348 A | 11/1987 | Horn et al. |

(Continued)

OTHER PUBLICATIONS

Ion Development Company, Inc., U.S. Copyright Registration for "Ion News Versions 1.0" Jan. 28, 1993.
Ion Systems, Inc., "ENEWS Reference Manual", pp. 1–48, 1997.
Ion Systems, Inc. "ENEWS (a.k.a. E*News)".

Anonymous, "Method to Permit Rapid Reading Of Displayed Text," International Business Machines, Technical Disclosure Bulletin, v. 28, n.2, pp. 513–515 (reprinted), Jul. 1985.
IBM Technical Disclosure Bulletin, vol. 33, No. 9, pp. 225–229, Feb. 1991.
IBM Technical Disclosure Bulletin, vol. 37, No. 12, pp. 15–16, Dec. 1994.
Dyson, P.E., "Future Tense's Texture: Slow Page Viewer Mars Powerful Design Tool," Seybold Report On Internet Publishing, vol. 1, No. 1, pp. 5–8, Sep. 1996.
Wagstaff, Sean, "Future Tense Texture 1.1 Designs Dynamic Pages (Future Tense's Web Authoring Software) (Software Review) (Evaluation)," MacWeek, vol. 11, No. 16, pp. p38(1), Apr. 1997.

*Primary Examiner*—M. Steelman

(57) ABSTRACT

A computer system for automatically converting a scrollable electronic document, including text, graphics, tables and combinations, from a scrollable format to a non-scrollable format, the system comprising a page-forming mechanism configured to operatively and automatically arrange the scrollable electronic information document into a plurality of non-scrollable pages, each having one or more columns wherein each of the columns has a width corresponding to a number of characters per line within a predetermined range of characters per line, a content formatter mechanism configured to be operatively responsive to embedded formatting commands, either common word-processing commands or html commands or both; a font-sizing mechanism configured to operatively permit a user to selectively alter the size of the characters comprising the non-scrollable pages; an image sizing mechanism configured either to automatically alter the widths of graphic images and tables in the electronic document to proportionately conform to the width of the columns, or to reduce the graphic images and tables to selectively expandable icons positioned in the display; a screen having a display window configured to entirely display a selected one of the non-scrollable pages; and a page-turning mechanism configured to selectively, sequentially and individually display the plurality of non-scrollable pages in the display window. A method is provided for practicing the system.

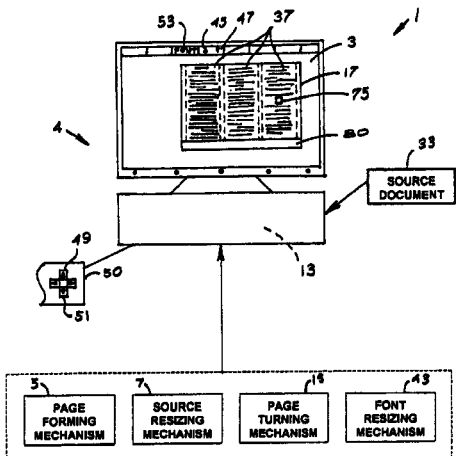

U.S. PATENT DOCUMENTS

| | | | |
|---|---|---|---|
| 4,891,771 A | 1/1990 | Edel et al. | |
| 5,021,772 A | 6/1991 | King et al. | |
| 5,089,990 A | 2/1992 | Saito | |
| 5,175,813 A | 12/1992 | Golding et al. | |
| 5,263,132 A * | 11/1993 | Parker et al. | 715/207 |
| 5,263,134 A | 11/1993 | Paal et al. | |
| 5,333,247 A | 7/1994 | Gest et al. | |
| 5,524,201 A | 6/1996 | Shwarts et al. | |
| 5,528,260 A | 6/1996 | Kent | |
| 5,634,064 A | 5/1997 | Warnock et al. | |
| 5,737,558 A | 4/1998 | Knight, III et al. | |
| 5,771,032 A | 6/1998 | Cline et al. | |
| 5,860,073 A | 1/1999 | Ferrel et al. | |
| 5,895,476 A * | 4/1999 | Orr et al. | 715/202 |
| 5,895,477 A * | 4/1999 | Orr et al. | 715/202 |
| 5,903,902 A * | 5/1999 | Orr et al. | 715/202 |
| 5,903,903 A | 5/1999 | Kennedy | |
| 5,909,690 A | 6/1999 | Tanigawa et al. | |
| 5,914,718 A * | 6/1999 | Chiu et al. | 715/863 |
| 5,926,825 A | 7/1999 | Shirakawa | |
| 6,012,071 A | 1/2000 | Krishna et al. | |
| 6,029,182 A | 2/2000 | Nehab et al. | |
| 6,144,974 A * | 11/2000 | Gartland | 715/205 |
| 6,232,967 B1 | 5/2001 | Kelley et al. | |
| 6,266,684 B1 | 7/2001 | Kraus et al. | |
| 6,281,986 B1 | 8/2001 | Form | |

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-76 and 77 are cancelled.

\* \* \* \* \*